US007246265B2

(12) United States Patent
Vollmar et al.

(10) Patent No.: US 7,246,265 B2
(45) Date of Patent: Jul. 17, 2007

(54) METHOD AND SYSTEM FOR AUTOMATICALLY VERIFYING FAULT HYPOTHESES PREDETERMINED BY A USER

(75) Inventors: Gerhard Vollmar, Meckenheim (DE); Zaijun Hu, Ludwigshafen (DE); Pousga Kabore, Dossenheim (DE)

(73) Assignee: ABB Research Ltd, Zurich (CH)

( * ) Notice: Subject to any disclaimer, the term of this patent is extended or adjusted under 35 U.S.C. 154(b) by 423 days.

(21) Appl. No.: 10/811,472

(22) Filed: Mar. 24, 2004

(65) Prior Publication Data

US 2004/0205400 A1    Oct. 14, 2004

Related U.S. Application Data

(63) Continuation of application No. PCT/EP02/10705, filed on Sep. 24, 2002.

(30) Foreign Application Priority Data

Sep. 24, 2001   (DE)   ................. 101 46 901

(51) Int. Cl.
    *G06F 11/00*    (2006.01)
(52) U.S. Cl. .................. 714/26; 717/124; 717/130; 717/131
(58) Field of Classification Search ............... 714/26, 714/37; 717/124, 130, 131; 700/26
    See application file for complete search history.

(56) References Cited

U.S. PATENT DOCUMENTS

| 5,187,773 | A | * | 2/1993 | Hamilton et al. ............. 706/52 |
| 5,272,704 | A | * | 12/1993 | Tong et al. .................... 714/26 |
| 5,467,355 | A | * | 11/1995 | Umeda et al. ............... 702/184 |
| 5,596,712 | A | * | 1/1997 | Tsuyama et al. ............. 714/26 |
| 5,604,841 | A | * | 2/1997 | Hamilton et al. ............. 706/11 |

(Continued)

FOREIGN PATENT DOCUMENTS

EP    0 307 191 A3    3/1989

(Continued)

OTHER PUBLICATIONS

Conference Proceedings, 2001 Machinery Reliability Conference, Apr. 2-4, 2001, Phoenix, Arizona, RELIABILITY Magazine, c/o Industrial Communications, Inc., 1704 Natalie Nehs Dr., Knoxville, TN 37931.

(Continued)

*Primary Examiner*—Scott Baderman
*Assistant Examiner*—Tim Bonura
(74) *Attorney, Agent, or Firm*—Laurence A. Greenberg; Werner H. Stemer; Ralph E. Locher

(57) ABSTRACT

A system is suitable for carrying out a method for the automated processing of fault hypotheses in a course of a fault cause analysis in the case of a fault event in a technical installation. A data processing system uses knowledge-based models for fault cause analysis and physical models of installation functions and processes that can be carried out by the technical installation. The system has a first unit for calculating and storing installation and process states. The first unit has access to the physical models and to data that is stored in a data server for the technical installation. The system has a second unit for hypothesis processing and an input/output device.

3 Claims, 7 Drawing Sheets

U.S. PATENT DOCUMENTS

| | | | |
|---|---|---|---|
| 5,793,933 A * | 8/1998 | Iwamasa | 706/45 |
| 6,223,143 B1 * | 4/2001 | Weinstock et al. | 703/17 |
| 6,282,469 B1 * | 8/2001 | Rogers et al. | 701/29 |
| 6,615,090 B1 * | 9/2003 | Blevins et al. | 700/26 |
| 6,633,782 B1 * | 10/2003 | Schleiss et al. | 700/26 |
| 6,820,072 B1 * | 11/2004 | Skaanning et al. | 706/52 |
| 6,901,535 B2 * | 5/2005 | Yamauchi et al. | 714/38 |
| 6,941,257 B2 * | 9/2005 | Roesner et al. | 703/15 |
| 6,952,658 B2 * | 10/2005 | Greulich et al. | 702/185 |
| 7,013,411 B2 * | 3/2006 | Kallela et al. | 714/47 |
| 2003/0028823 A1 * | 2/2003 | Kallela et al. | 714/26 |
| 2005/0043922 A1 * | 2/2005 | Weidl et al. | 702/183 |

FOREIGN PATENT DOCUMENTS

| FR | 2 636 151 B1 | 3/1990 |
|---|---|---|

OTHER PUBLICATIONS

Conference Proceedings, 2001 Machinery Reliability Conference, Apr. 2-4, 2001, Phoenix, Arizona, Reliability Magazine, c/o Industrial Communications, Inc., 1704 Natalie Nehs Dr., Knoxville, TN 37931.

* cited by examiner $$\frac{dV}{dt} = F_i - F_0 + F_0 f_1(t)$$

$$\frac{dT}{dt} = \frac{F_i}{V}(T_i - T) - \frac{k_0}{\rho_0 C_p}\Delta H e^{-\frac{E}{RT}}C_A - \frac{UA(T - T_{j,0})}{\rho_0 C_p V} + G(T, C_A)f_1(t)$$

$$\frac{dC_A}{dt} = \frac{F_i}{V}(C_{A,i} - C_A) - k_0 e^{-\frac{E}{RT}}C_A + \frac{F_0}{V}f_2(t)$$

$$\frac{dT_{j,0}}{dt} = \frac{F_j}{V_j}(T_{c,i} - T_{j,0}) + \frac{UA}{\rho_j V_j C_j}(T - T_{j,0})$$

where $$G(T, C_A) = \left[\frac{k_0}{\rho_0 C_p}\Delta H e^{-\frac{E}{RT}}C_A + \frac{UA(T - T_{j,0})}{\rho_0 C_p V}\right]$$

Fig. 3

Fault hypothesis – Power supply too high

Description
An overpressure in the reactor can be caused by an excessively high power supply.

Localization
Continuously stirring reactor XY

Verification checklist
   Valve not open?
   Diagnosis method: ...
   Diagnosis effort: low
   Temperature measurement fault?
   Diagnosis method: physical model
   Diagnosis effort: automatically verified
   Incorrect operating instructions?
   Diagnosis method: ...
   Diagnosis effort: average
   Leakage to the cooling casing?
   Diagnosis method: physical model
   Diagnosis effort: automatically verified

Fault tree reference
Incorrect operating instructions

Fig. 6

Fault hypothesis – Power supply too high

Description
An overpressure in the reactor can be caused by an excessively high power supply.

Localization
Continuously stirring reactor XY

Verification checklist
- Valve not open?
  - Diagnosis method: ...
  - Diagnosis effort: low
- *Temperature measurement fault excluded!*
  - Diagnosis method: physical model
  - Diagnosis effort: automatically verified
- Incorrect operating instructions?
  - Diagnosis method: ...
  - Diagnosis effort: average
- Leakage to the cooling casing!
  - Diagnosis method: physical model
  - Diagnosis effort: automatically verified

Fault tree reference
Incorrect operating instructions

Fig. 7

METHOD AND SYSTEM FOR AUTOMATICALLY VERIFYING FAULT HYPOTHESES PREDETERMINED BY A USER

CROSS-REFERENCE TO RELATED APPLICATION

This application is a continuation, under 35 U.S.C. § 120, of copending international application No. PCT/EP02/10705, filed Sep. 24, 2002, which designated the United States; this application also claims the priority, under 35 U.S.C. § 119, of German patent application No. 101 46 901.2, filed Sep. 24, 2001; the prior applications are herewith incorporated by reference in their entirety.

BACKGROUND OF THE INVENTION

Field of the Invention

The invention relates to a method and a system for determining fault causes and for verification of them in the course of a model-based fault cause analysis. The invention is suitable for assisting in fault cause analysis in the case of a fault event in a technical installation, or in a technical process which is carried out by the technical installation.

Model-based fault cause analysis is described, for example, in the reference by G. Vollmar, R. Milanovic, J. Kallela, titled "Model-Based Root Cause Analysis", Conference proceedings, 2001 Machinery Reliability Conference, April 2–4, Phoenix Ariz., published by RELIABILITY Magazine, c/o Industrial Communications, Inc. 1704 Natalie Nehs, Dr. Knoxville, Tenn. 37931 USA. When a fault occurs, the method provides a fault analyst with information in such a way that he can find the fault cause quickly and specifically. To do this, the fault analyst requires a computer which is equipped with a web browser and which can access the fault cause analysis models via an Internet link. A fault model is a hierarchical, tree-like structure. The uppermost level contains the fault event. The levels below this contain nodes which each represent hypotheses. These nodes are linked to one another like a tree. Each node has a checklist, which can be used to verify or negate hypotheses. A checklist is composed of a number of checklist items. The checklist items give instructions as to what information the analyst needs and how he must process it in order to verify the hypothesis. When searching for a malfunction in an installation, the fault analyst navigates from node to node and checks his installation on the basis of the attached checklists. If he accepts a hypothesis in this way, he navigates to the fault model on which it is based and to the fault that has led to the malfunction in his installation.

However, the processing of the checklist items for verification of fault hypotheses may be highly complex. All the valid data must be gathered and processed. The data which has to be used for processing is often no longer available or can be obtained only with difficulty and in a time-consuming manner. Quite often, the data must be processed further by use of complex mathematical functions in order to produce valid information. Problems occur in particular when the time required to do this is very long, or-when no specialist is available for this task.

Control systems and databases which store signals with a time reference in principle have data that can be used for verification of hypotheses. There are also software programs, which compress and process this data to form higher-quality information. However, the known procedure for fault cause analysis is still subject to the significant disadvantage that the information from control systems and their databases is not automatically made accessible to systems for fault cause analysis, so that this does not allow computer-aided verification of hypotheses, either.

SUMMARY OF THE INVENTION

It is accordingly an object of the invention to provide a method and a system for processing fault hypotheses which overcome the above-mentioned disadvantages of the prior art methods and devices of this general type, which automates the fault hypothesis analysis.

With the foregoing and other objects in view there is provided, in accordance with the invention, a method for the automated processing of fault hypotheses in a course of a fault cause analysis in a case of a fault event in a technical installation. The method includes providing a data processing system that uses knowledge-based models for the fault cause analysis and physical models of installation functions and processes carried out by the technical installation. The data processing system has a first unit for calculating and storing installation and process states and the first unit has access to the physical models and to data relating to the technical installation stored in a data server. The data processing system further has a second unit for hypothesis processing and an input/output device. A user of the data processing system determines an existence of a fault hypothesis. The second unit is used for accessing results of a calculation of the installation and process states and for accessing a checklist of the knowledge-based models for automatically verifying the fault hypothesis on a basis of conditions associated with checklist items in the checklist. A verification result is entered for each checklist item in a result list, and the result list is output.

The invention accordingly relates to a method and a system for determining fault causes and for verifying them in the course of a fault cause analysis, including computer-aided processing of checklist items on the basis of physical models for verification of hypotheses. The method and the system are suitable for assisting in the search for fault causes when fault events occur in industrial installations.

On-line data from industrial information technology, that is to say from a control system or planning system for example, is in this case converted by physical models to higher-quality information for fault cause analysis in real time. The physical models therefore provide the information that is required for processing checklist items. Ideally, all the checklist items can be processed automatically by physical models, thus verifying a predetermined fault hypothesis. Results achieved in this way are expediently passed via an XML interface to a system for fault cause analysis. During the processing of a fault tree, the hypotheses and checklist items that have already been processed by the models are signaled to a fault analyst.

With the foregoing and other objects in view there is provided, in accordance with the invention, a system for the automated processing of fault hypotheses in a course of a fault cause analysis in a case of a fault event in a technical installation. The system includes a data server storing data relating to the technical installation, and a data processing system processing knowledge-based models for the fault cause analysis and physical models of technical installation functions and processes which can be carried out by the technical installation. The data processing system contains a first unit for calculating and storing installation and process states. The first unit has access to the physical models and to the data stored in the data server for the technical installation. A second unit for hypothesis processing, and an input/output device connected to the second unit, are provided.

In accordance with an added feature of the invention, the data processing system is configured such that once a user has predetermined a fault hypothesis, the second unit accesses results of a calculation of the installation and process states and accesses a checklist of the knowledge-based models to automatically verify the fault hypothesis on a basis of conditions which are associated with checklist items in the checklist, enters the verification result for each checklist item in a result list, and outputs the result list.

Other features which are considered as characteristic for the invention are set forth in the appended claims.

Although the invention is illustrated and described herein as embodied in a method and a system for processing fault hypotheses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an illustration of a physical model of a process;

FIG. 6 is a block diagram of the processing of a fault hypothesis of the power supply being too high; and FIG. 7 is a block diagram showing an automatically verified checklist.

DESCRIPTION OF THE PREFERRED EMBODIMENTS

Figure 1:
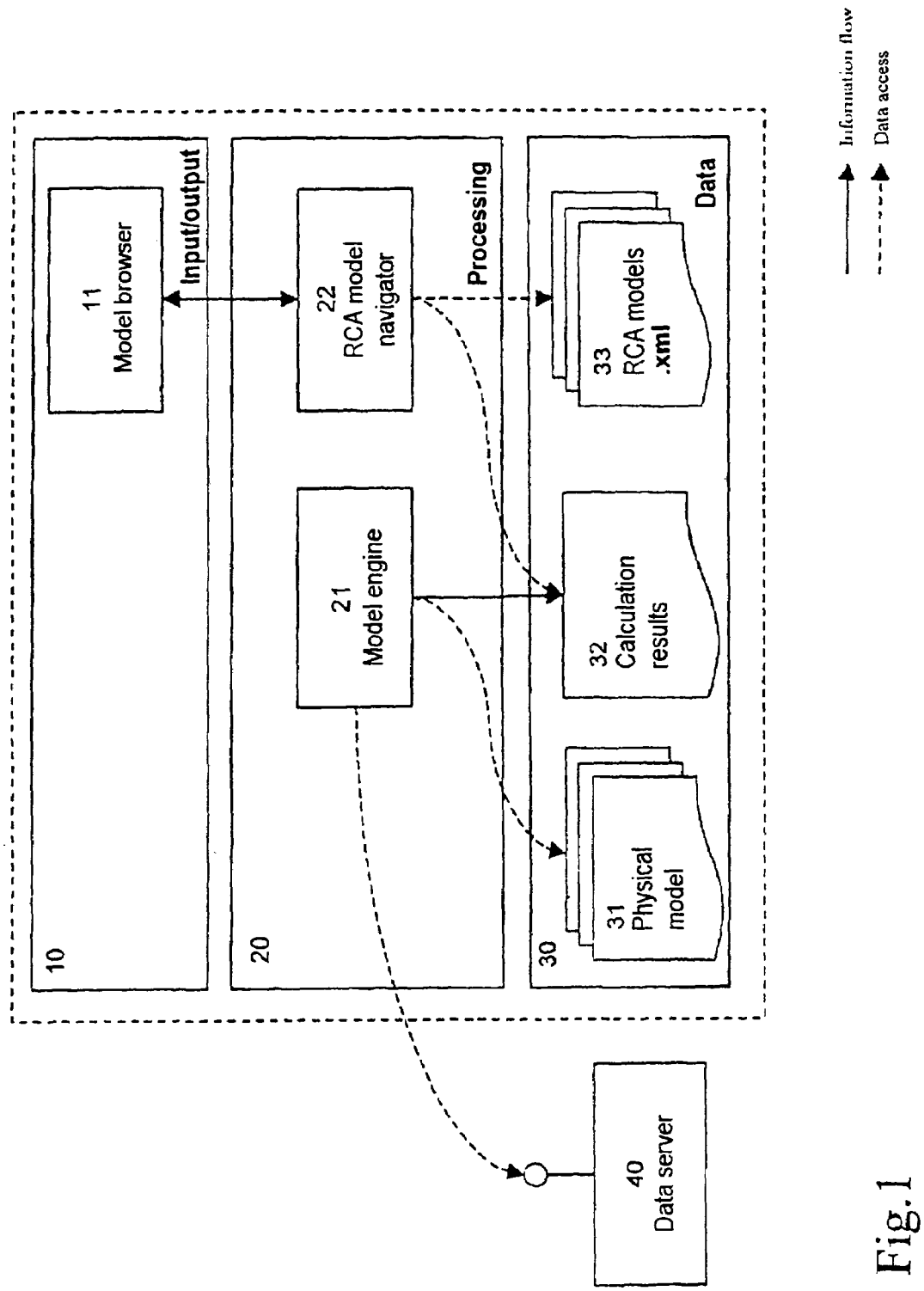
FIG. 1 is a block diagram of a system for automatically processing a fault hypothesis according to the invention.

Referring now to the figures of the drawing in detail and first, particularly, to FIG. 1 thereof, there is shown a system 1 for the automatic processing of fault hypotheses with the aid of physical models. The system contains an input/output device 10, a hypothesis processing device 20 and a data memory 30.

The input/output device 10 contains a model browser 11, by which a fault analyst can process knowledge-based models 33 which are based on fault trees and are referred to as root cause analysis (RCA) models. In particular, this allows a fault hypothesis to be predetermined, which can be verified automatically by the system.

The hypothesis processing device 20 contains a processing device 21, which is referred to as a model engine, for physical models 31 and a hypothesis processor 22, which is referred to in FIG. 1 as the RCA model navigator 22. The processing device 21 cyclically accesses process data provided from a data server 40, calculates installation and process states after predetermining a physical model 31, and stores the result in a data memory area for calculation results 32. While processing a hypothesis, the hypothesis processor 22 accesses the calculation results 32, as well as checklists for the knowledge-based models 33.

The data memory 30 contains memory areas with files in which the physical models 31 and the knowledge-based models 33 are stored, and in which the calculation results 32 are stored.

Figure 2:
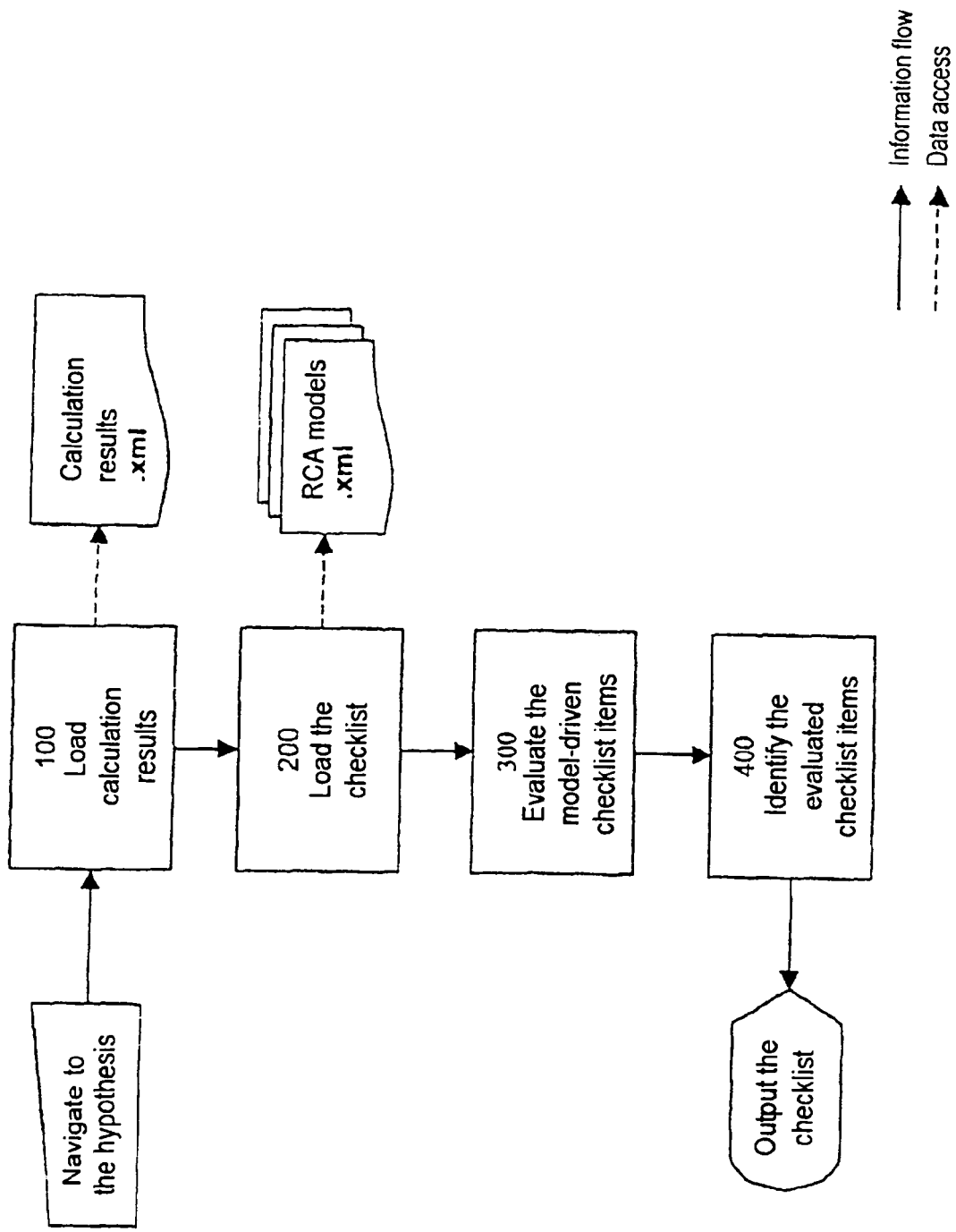
FIG. 2 is a flow diagram showing a method for automatic processing of fault hypotheses.

FIG. 2 shows the method for automatic processing of fault hypotheses with the aid of the physical models that are illustrated in general form in FIG. 1 and in the form of an example in FIG. 3. The fault analyst first navigates to a fault hypothesis in order to start the method. In method step 100, the hypothesis processor 22 loads the calculation results 32 which are required for verification of the hypothesis. In subsequent step 200, the hypothesis processor 22 also loads the checklist for the relevant hypothesis from the knowledge-based models 33. FIG. 6 shows one example of a checklist such as this. In step 300, the hypothesis processor 22 compares the calculation results with the checklist items from the checklist. The checklist items for which models are stored are in this case evaluated automatically. Each checklist item contains a condition for verification of the hypothesis. In step 400, the hypothesis processor 22 identifies whether the checklist item does or does not satisfy the condition. As an example, FIG. 7 shows how a checklist is output after processing.

By way of example, FIG. 3 shows the physical model of a chemical process in a reactor. The model is indicated in the form of a differential equation. The model describes the process parameters in the fault-free state. Using a model such as this, a fault can be determined by comparison of the calculated parameter with the actually measured value. For example, the inlet and outlet temperatures of the cooling water may be calculated. If there is a discrepancy between the calculated outlet temperature and the measured value, an appropriate equation system may be used to deduce a measured value fault, taking account of specific boundary conditions. The differential equation that is indicated may be used, for example, to diagnose a temperature measurement error by $T_0$, and a leakage by V.

Figure 4:
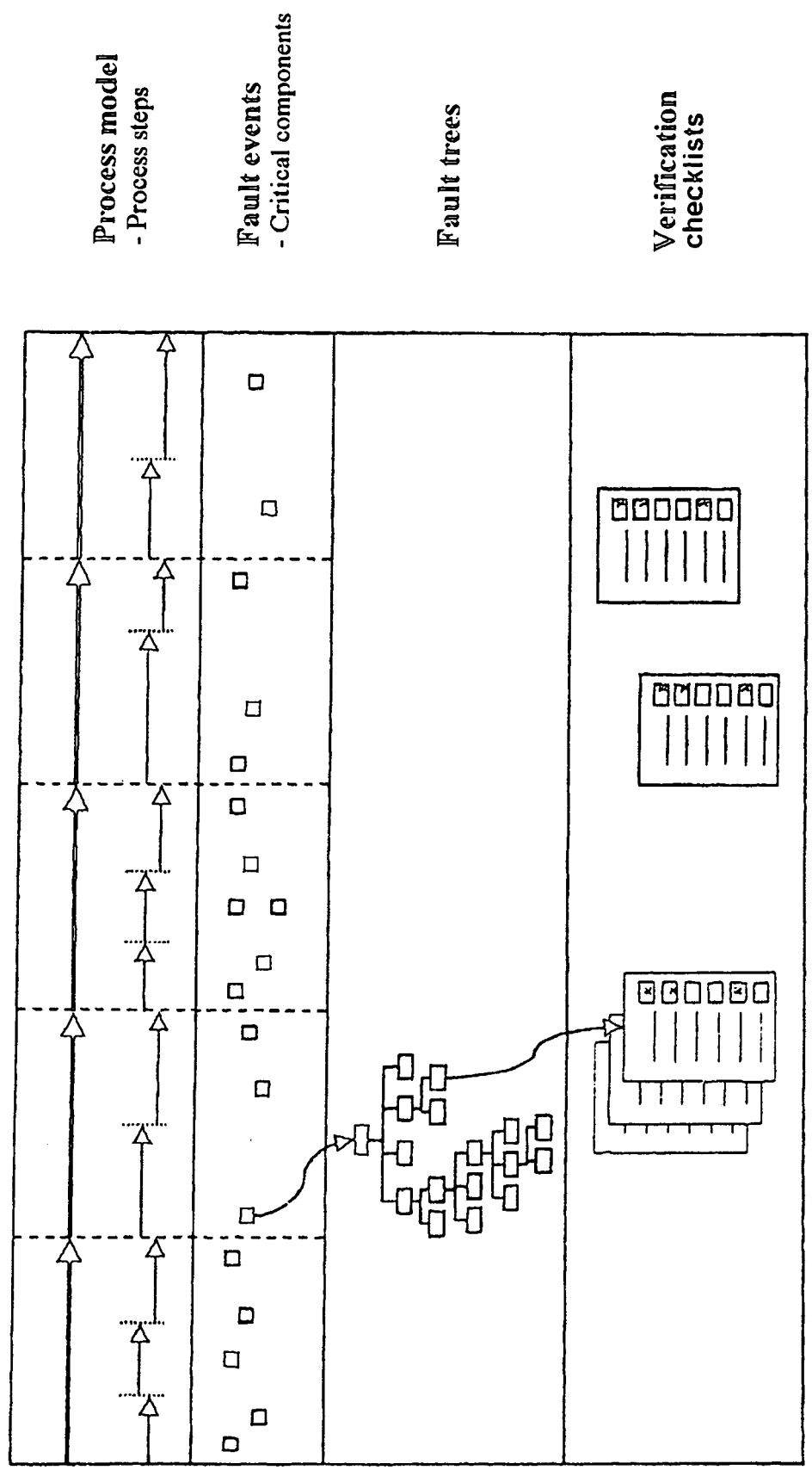
FIG. 4 is an illustration showing a fundamental description of a fault model.

FIG. 4 shows the fundamental description of a fault model as a knowledge-based model 33. The described uppermost level contains a process model with its process steps. Each process step may be subdivided into further process steps. Fault events and critical components are associated with each process step. Once again, fault trees with nodes exist for this purpose. The nodes in a fault tree represent fault hypotheses. A verification checklist represents a major component of the content of a fault hypothesis. The contents of a hypothesis are described in more detail in FIG. 5.

Figure 5:
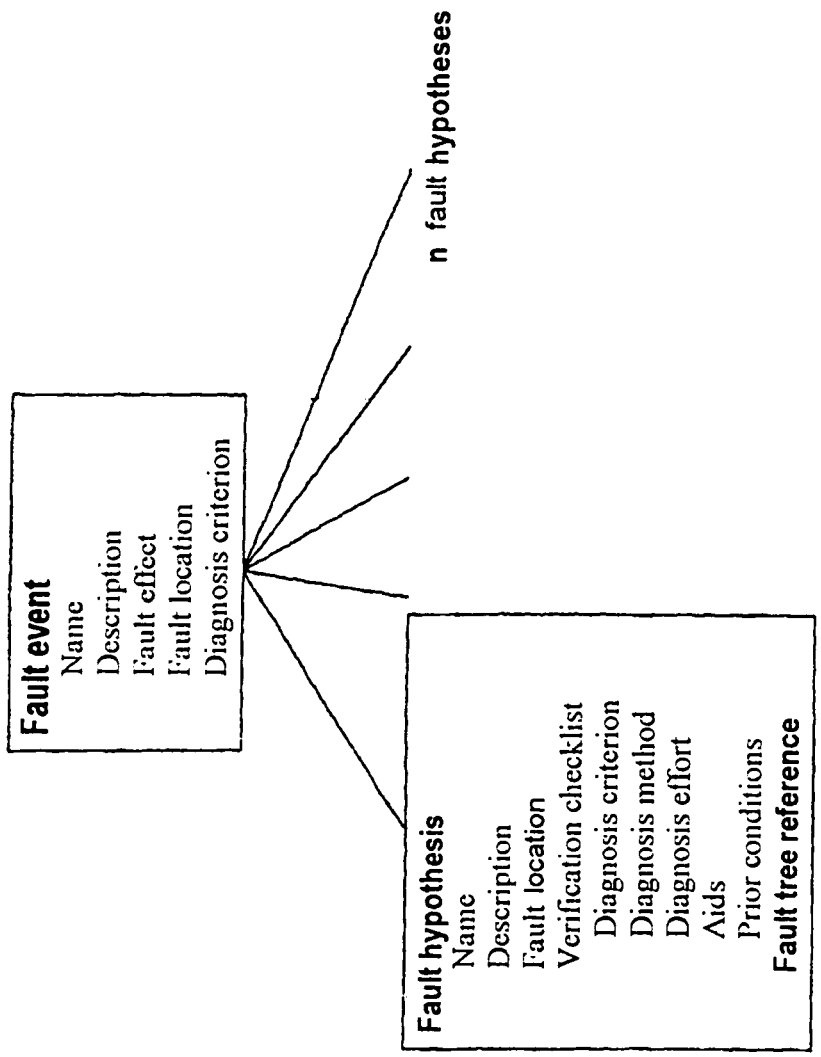
FIG. 5 is a block diagram of a structure of a fault tree.

FIG. 5 shows the structure of a fault tree. The model is hierarchical and, in its simplest version, contains two levels. The uppermost level represents the fault event. One fault event may be associated with a number of fault hypotheses. The logical relationship can be formulated as follows: one or more fault hypotheses may cause the fault event. The fault event and fault hypothesis have a similar content description. For deeper analysis, the fault hypothesis may refer to other fault models, that is to say a fault tree may be composed of a number of tree elements. The link is produced by the fault tree reference attribute.

FIG. 6 shows, by way of example, how the system presents a user with the fault hypothesis "power supply too high". A description of the fault hypothesis in this case explains the relationship between the fault and the possible cause. A localization process indicates the possible fault location; in the example, this is the reactor XY. The hypothesis is verified by processing a verification checklist. The tests "temperature measurement fault" and "leakage to the cooling casing" may be verified automatically by a physical model. A fault tree reference allows access to an associated fault tree for deeper diagnosis relating to the diagnosis criterion "incorrect operating instructions".

By way of example, FIG. 7 shows how an automatically verified checklist is displayed. Diagnosis criteria that have already automatically been verified negatively are in this case displayed in italics. A positively verified diagnosis criterion is displayed in bold text and is emphasized by exclamation marks. Diagnosis criteria that are still to be tested are shown in bold text and with question marks.

We claim:

1. A method for automated processing of fault hypotheses in a course of a fault cause analysis in a case of a fault event in a technical installation, which comprises the steps of:
   providing a data processing system which uses knowledge-based models for the fault cause analysis and physical models of installation functions and processes carried out by the technical installation, the data processing system having a first processor for calculating and storing installation and process states and the first means having access to the physical models and to data relating to the technical installation stored in a data server, the data processing system further having a second processor for hypothesis processing and an input/output device;
   upon occurrence of a fault, determining, by a user of the data processing system, an existence of a fault hypothesis;
   accessing, through the second processor for hypothesis processing, results of a calculation of the installation and process states and accessing a checklist of the knowledge-based models for automatically verifying the fault hypothesis determined to exist by the user in the determining step on a basis of conditions associated with checklist items in the checklist;
   entering a verification result for each checklist item in a result list; and
   outputting the result list.

2. A system for automated verification of fault hypotheses determined by a user in a course of a fault cause analysis in a case of a fault event in a technical installation, the system comprising:
   a data server storing data relating to the technical installation; and
   a data processing system processing knowledge-based models for the fault cause analysis and physical models of technical installation functions and processes which can be carried out by the technical installation, said data processing system containing:
      a first processor for calculating and storing installation and process states, said first means having access to the physical models and to the data stored in said data server for the technical installation;
      a second processor for hypothesis processing;
      an input/output device connected to said second processor for hypothesis processing, said input/output device being used as an interface by the user to determine the existence of a fault hypothesis in response to the fault event; and
      said second processor being configured to process and verify the fault hypothesis determined by the user.

3. The system according to claim 2, wherein said data processing system is configured such that once a user has predetermined a fault hypothesis, said second processor for hypothesis processing accesses results of a calculation of the installation and process states and accesses a checklist of the knowledge-based models to automatically verify the fault hypothesis on a basis of conditions which are associated with checklist items in the checklist, enters the verification result for each checklist item in a result list, and outputs the result list.

* * * * *